United States Patent [19]
Gunnarsson

[11] Patent Number: 5,444,203
[45] Date of Patent: Aug. 22, 1995

[54] SAFETY SWITCH FOR AN INDUSTRIAL MACHINE

[75] Inventor: Sven-Eric Gunnarsson, Västerås, Sweden

[73] Assignee: Asea Brown Boveri AB, Västerås, Sweden

[21] Appl. No.: 211,866

[22] PCT Filed: Oct. 14, 1992

[86] PCT No.: PCT/SE92/00720
§ 371 Date: Apr. 20, 1994
§ 102(e) Date: Apr. 20, 1994

[87] PCT Pub. No.: WO93/09377
PCT Pub. Date: May 13, 1993

[30] Foreign Application Priority Data
Nov. 1, 1991 [SE] Sweden ................. 9103211

[51] Int. Cl.6 ............................................. H01H 13/50
[52] U.S. Cl. ..................................................... 200/510
[58] Field of Search .................. 200/510, 509, 345

[56] References Cited
U.S. PATENT DOCUMENTS

| | | | |
|---|---|---|---|
| 2,616,009 | 10/1952 | Roeser | 200/510 |
| 2,919,333 | 12/1959 | Scholin et al. | 200/510 |
| 3,118,206 | 1/1964 | Bush | 200/510 |
| 3,384,725 | 5/1968 | Poch | 200/510 |
| 3,674,970 | 7/1972 | Bendocs | 200/345 X |
| 4,450,331 | 5/1985 | Fukukura | 200/510 |

Primary Examiner—Renee S. Luebke
Attorney, Agent, or Firm—Watson, Cole, Grindle & Watson

[57] ABSTRACT

The invention relates to a safety switch intended to be connected into a safety circuit for an industrial machine, for example an industrial robot. The switch comprises a contact device (2) with a hand-operated device (3, 4) in which a pressure rod (31) is displaceable against the action of a return spring (33) from a first end position via an operating position to a second end position, the safety circuit being closed only in the operating position. During the return movement of the pressure rod from its second to its first end position, the contact device (2) is not affected, and the safety circuit thus remains open during the whole of this return movement.

5 Claims, 3 Drawing Sheets

SAFETY SWITCH FOR AN INDUSTRIAL MACHINE

TECHNICAL FIELD

The present invention relates to a hand-operated safety switch for an industrial machine, intended to be connected with an emergency stop circuit for the machine. The safety switch is primarily intended to be used in applications in the engineering industry, for example in an industrial robot application where persons are present within the operating range of the robot.

BACKGROUND ART

An industrial robot can be controlled with the aid of a joystick. During a teaching or programming procedure, the position and/or orientation of the robot tool can be controlled in the desired manner by means of the joystick. The joystick can either be arranged on a fixed control cabinet or on a smaller, separate programming unit, which during programming or teaching can be held in the hand or be placed on a table. In order that programming shall not take an unreasonably long time, it is necessary that a full deflection of the joystick causes a movement with a relatively high speed of response in the robot. During the teaching procedure it may be necessary for personnel to stay in the vicinity of the robot in order to eliminate the risks of injuries which arise in this connection, a safety plate is arranged on programming units of the above-mentioned kind, on which safety plate the operator's hand rests when operating the joystick with the aid of the fingers. When the hand is removed, the safety plate senses this and influences the control system such that the joystick is rendered inoperative. In this way, it is prevented that an unintentional contact with the joystick gives rise to a movement of the robot. A device of this kind is described in Swedish printed patent application 450 285 and in Asea Journal 1982, No. 6, pp. 145–150.

In the known device there may be a certain risk that the operator, in an emergency situation, reacts incorrectly and instead of removing his hand from the safety plate presses even harder, whereby the robot continues its movement with an ensuing risk of both material damage and personal injury. To avoid this it has been proposed to use a contact device, actuated by the safety device, with two end positions located on different sides of an operating position, one of the end positions constituting the initial position (the rest position) and the other end position an extra neutral position. A drawback with this design, however, is that the contact device while returning to the initial position has to pass the operating position, whereby the safety circuit is briefly closed with an ensuing risk of uncontrolled movements of the robot.

SUMMARY OF THE INVENTION

The present invention aims to provide a safety switch designed for the above-mentioned field of use, which does not suffer from the above-mentioned drawbacks of comparable prior art designs. This is achieved according to the invention by a safety switch with the characteristic features stated in the claims.

The safety switch according to the invention comprises a contact device with a hand-operated device in which a pressure operating member is displaceable against the action of a return spring from a first end position via an operating position to a seconded end position, whereby the safety circuit, into which the switch is intended to be connected, is connected only in the operating position. The operating device is arranged such that the contact device is not affected during the return movement of the pressure operating device from its second to its first end position, and thus the safety circuit remains open during the whole of this return movement.

A safety switch according to the invention makes it possible for industrial machines of the above-mentioned kind to be installed, used and maintained with an adequate degree of safety against personal injury. In addition, the switch is simple to manufacture and mount.

BRIEF DESCRIPTION OF THE DRAWINGS

The invention will be explained in greater detail by describing an embodiment with reference to the accompanying drawings, wherein.

DESCRIPTION OF THE PREFERRED EMBODIMENT

Figure 1:
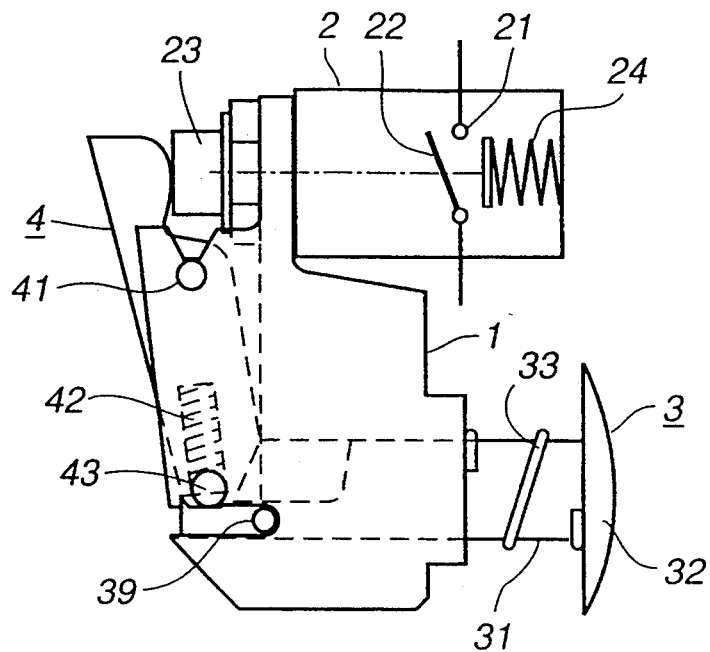
FIG. 1 is a side view of a safety switch according to the invention in its initial position (first end position)
Figure 2:
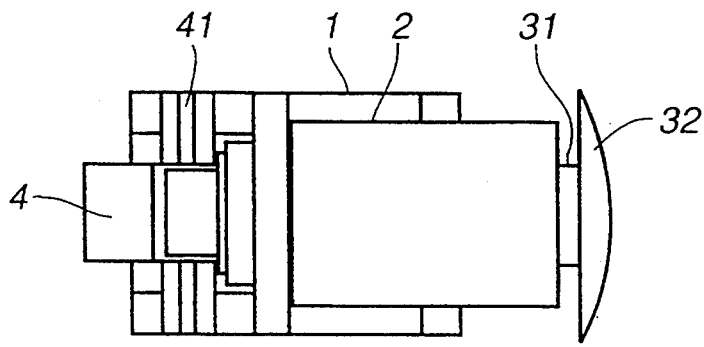
FIG. 2 shows the switch in the same position in a view from above.

The safety switch shown in FIG. 1 comprises a housing 1, in the upper part of which a microswitch 2 is fixed and in the lower part of which an operating member 3 in the form of a pressure rod 31 with a pressure plate 32 is journalled so as to be longitudinally displaceable. Between the pressure plate 32 and the housing 1, a compression spring (return spring) 33 is arranged.

The microswitch 2 comprises at least one contact pair with one fixed and one movable contact 21 and 22, respectively. With the aid of an actuating member 23, the movable contact 22 may be displaced from the open position shown in FIG. 1 to the closed position shown in FIG. 3. The movable contact is permanently influenced by a return spring 24 in a direction towards the open position.

Figure 4:
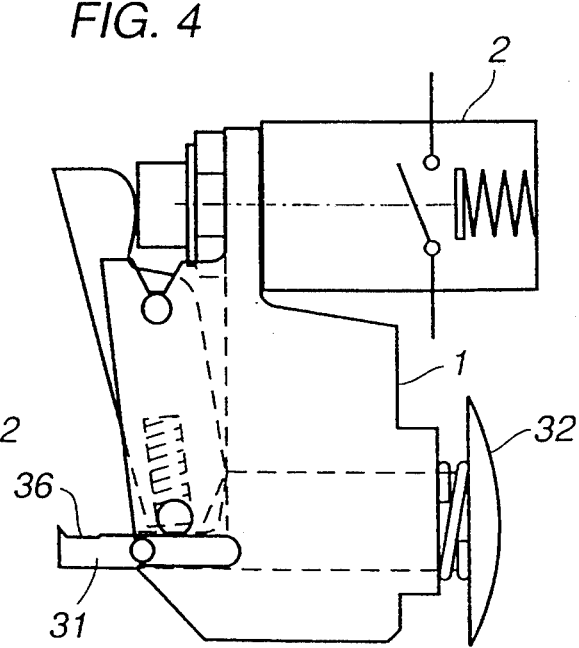

The transmission of the operating force from the operating member 3 to the microswitch 2 is achieved by a lever arm 4 which, with the aid of a cylindrical pin 41, is rotatably journalled in the housing 1. In the lower part of the lever arm 4 there are a compression spring 42 and a ball 43. The spring-loaded ball 43 presses against the pressure rod 31, which is provided with a recess 36 (FIG. 4), arranged at that end of the rod which is located furthest away from the pressure plate 32 and cooperating with the ball 43, for achieving a coupling engagement between the pressure rod and the lever arm. The upper end portion of the lever arm makes contact with the actuating member 23 of the microswitch.

Figure 5:
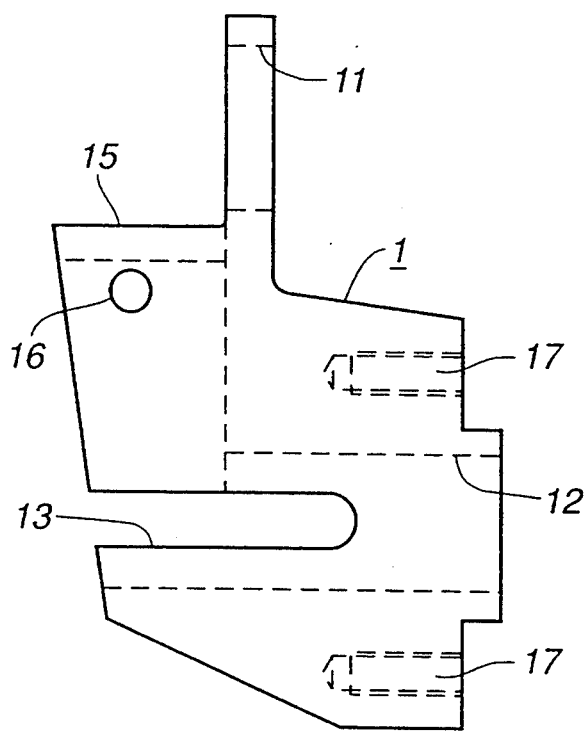
FIGS. 5, 6 and 7 show the housing of the switch in a view from the side (FIG. 5), in an end view from the left (FIG. 6), and in a view from above (FIG. 7), respectively.
Figure 6:
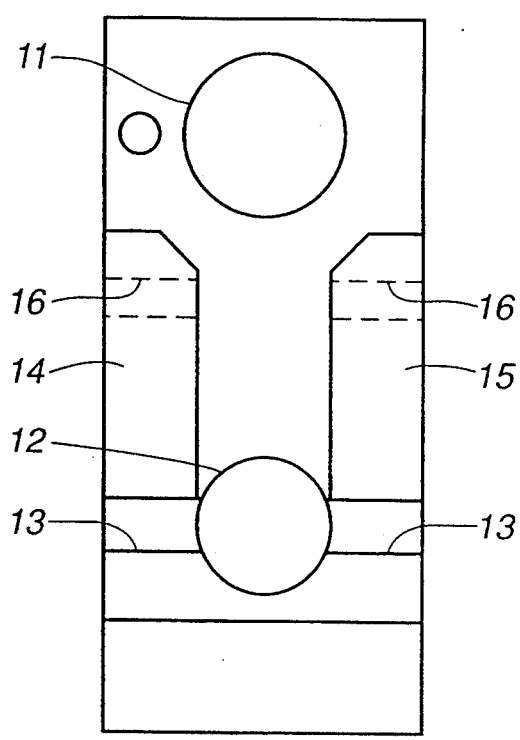
Figure 7:
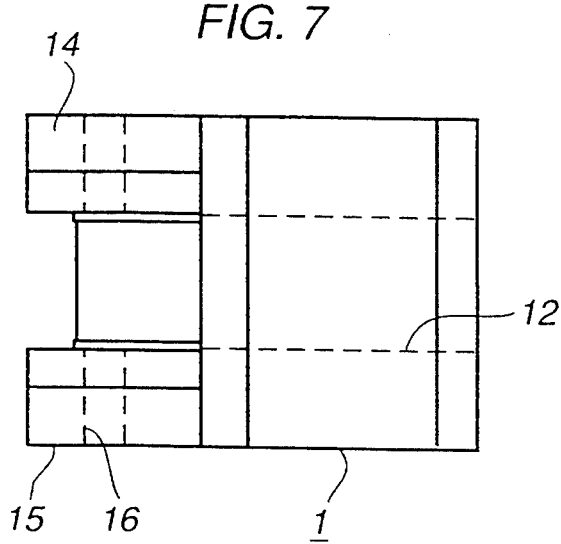

As is clear from FIGS. 5–7, the housing 1 of the safety switch is provided, in its upper part, with a fixing hole 11 for the microswitch 2 and, in its lower part, with a bearing hole 12 with guide slots 13 for the pressure rod 31. The center lines of the holes 11, 12 are parallel. Between the orifices of the holes 11, 12 on one side of the housing 1, two parallel wall portions 14, 15 extend, between which the lever arm 4 is intended to be mounted. The wall portions are provided with through-holes 16 for the bearing pin 41 of the lever arm. Further, the housing 1 is provided with two fixing holes 17 for fixing the safety switch in, for example, a programming box for an industrial robot.

Figure 8:
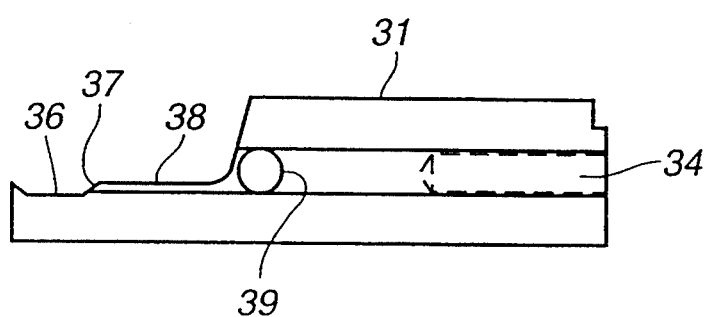
FIGS. 8 and 9 show a pressure rod, included in the operating member of the switch, in a side view and in an end view from the left, respectively.
Figure 9:
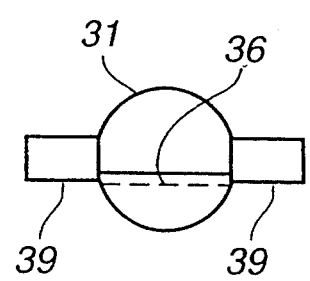

The pressure rod 31, which is shown separately in FIGS. 8 and 9, has a substantially circular cross section and is provided at one end with an axial hole 34 for fixing the pressure plate 32. At its other end the pressure rod is provided with a recess which, nearest the end surface of the rod, is made with a deeper portion 36 which forms a seat for the ball 43 and which, via a shoulder 37, changes into a shallower portion 38 which forms a rolling or sliding path for the ball 43. The height of the shoulder is considerably smaller than the diameter of the ball, for example about 1 mm if the diameter of the ball is 4 mm. The shoulder can suitably be made inclined so as to obtain a more even transition between the two portions 36 and 38. In the embodiment shown the shoulder 37 forms an angle of about 45° with the longitudinal axis of the pressure rod.

The pressure rod 31 is provided with radially projecting guide pins 39 which fit into the guide slot 13 of the housing. The pins 39 limit the axial movement of the pressure rod in a direction towards the right to the end position shown in FIG. 1 and also prevents the rod from moving in the direction of rotation.

Figure 10:
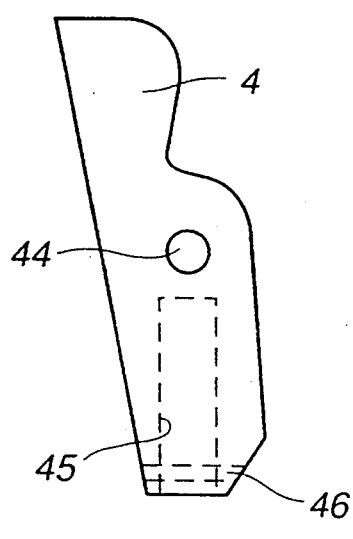
FIGS. 10 and 11 show a lever arm, included in the switch, in a side view and a view from the left, respectively.
Figure 11:
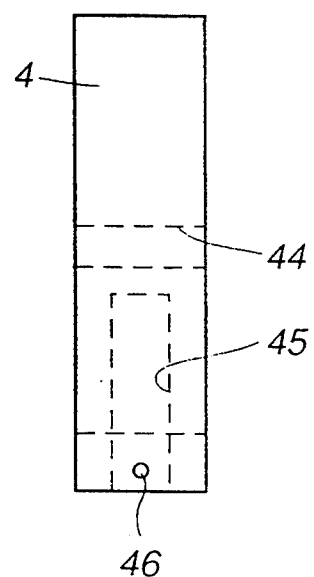

The lever arm 4 is shown separately in FIGS. 10 and 11. It has a transversal hole 44 for the bearing pin 41 as well as a longitudinal hole 45 for accomodating the compression spring 42 and the ball 43. The centre lines of the holes 44, 45 are directed perpendicularly to each other. At the orifice of the hole 45, there is a transversal hole 46 for temporary insertion of a mounting pin to keep the compression spring 42 and the ball 43 fixed in the hole 45 during mounting.

The pressure rod 31 is suitably made of a plastic material, for example acetal plastic, whereas the other parts, such as the housing 1 and the lever arm 4, are suitably made of metal.

The safety switch operates as follows: In the initial position shown in FIG. 1, the spring 33 keeps the pressure rod 31 in its first end position, and the spring 24 built into the microswitch keeps the switch in the open position, whereby the safety loop into which the switch is connected is open. By pressing on the pressure plate 32, the pressure rod 31 is pressed in and influences the lever arm 4 which, in its turn, presses the actuating member 23 of the microswitch into the operating position shown in FIG. 3, in which the safety loop is closed. In normal operation, the movement on the pressure rod takes place between the initial position according to FIG. 1 and the operating position according to FIG. 3.

Figure 3:
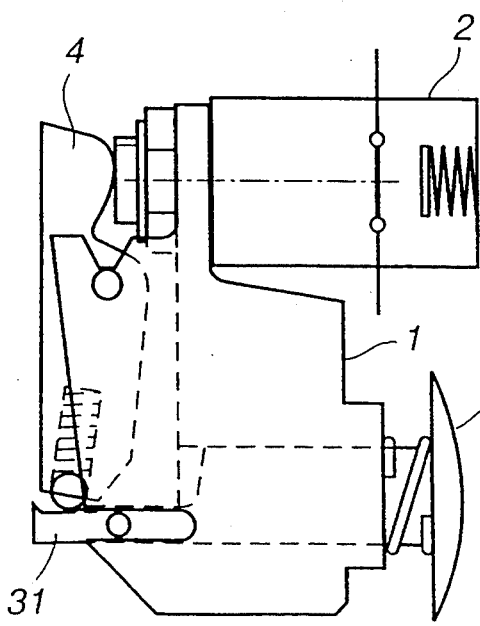
FIGS. 3 and 4 are side views of the switch in its operating position (mid-position) and in its second end position, respectively.

When in the operating position according to FIG. 3 and an emergency situation arises, the pressure plate can either be released or be pressed in further. In the latter case, an increased pressure is required for the ball 43 to pass the shoulder 37 between the deeper portion 36 and the shallower portion 38 on the pressure rod. This increased pressure is determined by the spring 42. When the ball has arrived on the shallower portion 38 of the pressure rod, the lever arm 4 is disengaged from the pressure rod and the microswitch can return to its open position while being influenced by the return spring 24, while continuing the pressing of the pressure rod until the rod has reached its second end position according to FIG. 4. Also in this end position, the safety loop is thus open.. To get from the second end position according to FIG. 4 to the first end position (initial position) according to FIG. 1, the pressure plate 32 is released and the switch resumes the initial position with the aid of the spring 33. During the return movement of the pressure rod from the second to the first end position, the microswitch 2 is not influenced, and the safety loop is thus open during the whole return movement.

A considerable advantage with the described switch design is that no adjustment is required when mounting the switch.

The invention is not limited to the embodiment shown but several modifications are possible within the scope of the claims.

I claim:

1. A safety switch for an industrial machine, said switch comprising
   a housing,
   a contact device mounted in said housing and being switchable between an open position and a closed position, said contact device comprising a spring for biasing the contact device in a direction toward said open position,
   a hand-operated device for switching said contact device between said open position and said closed position, said hand-operated device comprising a pressure operating member and a lever arm for transmitting operating force from the pressure operating member to the contact device, said lever arm being rotatably journalled in said housing and making contact at one of its end portions with the pressure operating member through resilient means and at its other end portion with an actuating member associated with the contact device, said resilient means comprising a ball and a compression spring for pressing the ball against a side surface of the pressure operating member, said pressure operating member being displaceable against the action of a return spring from a first end position via a mid-position to a second end position, the pressure operating member being connected to the contact device through said lever arm in such a way that the contact device assumes the open position when the operating member is in its end positions and the closed position when the operating member is in its mid-position, and that the contact device is not influenced by the operating member when the, operating member returns from its second to its first end position.

2. A safety switch according to claim 1, wherein the pressure operating member comprises a pressure rod which is longitudinally displaceable in a bearing hole located in the housing, the rod being provided with transversely projecting guide pins which are in engagement with guide slots located in the housing, for limiting the return movement of the rod and for fixing the rod in the direction of rotation.

3. A safety switch according to claim 1, wherein the contact device comprises a microswitch.

4. A safety switch according to claim 1 wherein the side surface of the pressure operating member has a recess which is adapted such that, together with the resilient means of the lever arm, effects a coupling engagement between the operating member and the lever arm during the displacement of the operating member from its first end position to its mid-position, but which, during continued displacement of the operating member (31) from the mid-position towards the second end position, permits the ball to be pressed out of the recess, whereby the lever arm is disengaged from the operating member.

5. A safety switch according to claim 4, wherein the recess in the pressure operating member has a deeper portion provided at one end of the pressure rod and forming a seat for the ball, and the recess having a shallower portion which forms a rolling or sliding path for the ball.

* * * * *